United States Patent [19]

Agarwal et al.

[11] Patent Number: 5,209,111

[45] Date of Patent: May 11, 1993

[54] METHOD OF MEASURING CROSS-FLOW VORTICES BY USE OF AN ARRAY OF HOT-FILM SENSORS

[75] Inventors: Naval K. Agarwal; Dal V. Maddalon, both of Yorktown; Siva M. Mangalam, Kingsmill on the James, all of Va.

[73] Assignee: The United States as represented by the United States National Aeronautics and Space Administration, Washington, D.C.

[21] Appl. No.: 823,805

[22] Filed: Jan. 7, 1992

[51] Int. Cl.$^5$ ............................................. G01M 9/00
[52] U.S. Cl. ................................. 73/147; 73/178 R; 73/204.11
[58] Field of Search ............... 73/147, 178 R, 204.11, 73/178 T, 178 H, 181; 374/137, 144

[56] References Cited

U.S. PATENT DOCUMENTS 4,727,751  3/1988  Holmes et al. ......................... 73/147

*Primary Examiner*—Donald O. Woodiel
*Attorney, Agent, or Firm*—George F. Helfrich

[57] ABSTRACT

The invention is a method for measuring the wavelength of cross-flow vortices of air flow having streamlines of flow traveling across a swept airfoil. The method comprises providing a plurality of hot-film sensors. Each hot-film sensor provides a signal which can be processed, and each hot-film sensor is spaced in a straight-line array such that the distance between successive hot-film sensors is less than the wavelength of the cross-flow vortices being measured. The method further comprises determining the direction of travel of the streamlines across the airfoil and positioning the straight-line array of hot film sensors perpendicular to the direction of travel of the streamlines, such that each sensor has a spanwise location. The method further comprises processing the signals provided by the sensors to provide root-mean-square values for each signal, plotting each root-mean-square value as a function of its spanwise location, and determining the wavelength of the cross-flow vortices by noting the distance between two maxima or two minima of root-mean-square values.

4 Claims, 6 Drawing Sheets

METHOD OF MEASURING CROSS-FLOW VORTICES BY USE OF AN ARRAY OF HOT-FILM SENSORS

ORIGIN OF THE INVENTION

The invention described herein was jointly made by an employee of the United States Government and contract employees during the performance of work under a NASA contract and is subject to the provisions of Public Law 95-517 (35 USC 202) in which the contractor has elected not to retain title.

BACKGROUND OF THE INVENTION

1. Field of the Invention

This invention relates generally to measurement of cross-flow vortices and more specifically to a method of measuring the wavelength of cross-flow vortices by an array of hot-film sensors.

2. Description of the Related Art

The attainment of laminar air flow on aircraft wings has significant potential for reducing drag and increasing fuel efficiency. One method of drag reduction involves the avoidance of or delay in the transition of the laminar boundary-layer to turbulent flow. On a swept wing the air flow is highly three-dimensional, and four fundamental instability modes—contamination at the attachment line and streamwise, centrifugal, and cross-flow disturbances—strongly influence the transition of the laminar boundary-layer to turbulent flow.

Control of the cross-flow disturbances first requires understanding of its development in the laminar boundary-layer. Cross-flow disturbances can be characterized as a stationary disturbance with regularly-spaced vortices and a non-stationary or traveling disturbance having large amplitude harmonics. Cross-flow vortices arise from a dynamic or inviscid instability of the inflectional cross-flow velocity profile produced by the three-dimensionality of the mean flow field. Detailed measurements of the cross-flow vortices would facilitate an understanding of the cross-flow disturbances.

Prior art includes both experimental and theoretical studies on the nature of cross-flow disturbances. Poll discloses in "Some Observations of the Transition Process on the Windward Face of a Long Yawed Cylinder," *J. Fluid Mech.*, Vol. 150, 1985, pp. 329-56, the effect of cross-flow instability upon the boundary-layer transition on a swept cylinder. Malik et al in AIAA 84-1672 (1984) theoretically studied the cross-flow over a yawed cylinder including curvature effects. Dagenhart et al in AIAA 89-1892 (1989) observed stationary cross-flow vortices through flow visualization using sublimating chemicals. Sari et al in AIAA 85-0493 (1985) made detailed hot-wire measurements in the spanwise and chordwise direction at a constant distance from the wing surface. Their hot-wire measurements at the maximum cross-flow velocity location resulted in a different wavelength of the cross-flow vortices from the wavelength obtained during flow visualization. Mangalam et al in AIAA 90-1636 disclose hot-film measurements at one chord location to obtain cross-flow characteristics.

SUMMARY OF THE INVENTION

An object of the present invention is to provide a direct and true value of the wavelength of cross-flow vortices of air flow having streamlines of flow traveling across a swept airfoil.

Another object of the present invention is to measure the wavelength of cross-flow vortices at various spanwise locations.

A further object of the present invention is to measure the wavelength of cross-flow vortices without any localized flow disturbances.

The present invention attains the foregoing and additional objects by providing a method for measuring the wavelength of cross-flow vortices by use of a plurality of hot-film sensors. Each hot-film sensor provides a signal which can be processed. Each sensor also is spaced, preferably equally spaced, in a straight-line array such that the distance between successive hot-film sensors is less than the wavelength of the cross-flow vortices being measured. Preferably, the distance between sensors is within a range of one-eighth to one-tenth the wavelength of the cross-flow vortices being measured, which means eight to ten sensors exist within the distance of one cross-flow wavelength.

The method further comprises determining the direction of travel of the streamlines across the airfoil and positioning the straight-line array of hot-film sensors perpendicular to the direction of travel of the streamlines, such that each sensor has a spanwise location. The method then processes the signals provided by the sensors. The processing of the signals involves a system which comprises a constant temperature anemometer, a digital data acquisition system, and a computer. The system provides a root-mean-square value for each signal provided by each hot-film sensor. The method then plots each root-mean-square value as a function of its spanwise location, and determines the wavelength of the cross-flow vortices by noting the distance between two maxima or two minima of root-mean-square values.

Preferably, each hot-film sensor also has a cold resistance within a maximum variation of ±0.2 ohms. Accordingly, the method provides a direct and true value of the wavelength of cross-flow vortices of air flow at various spanwise locations without any localized flow disturbances.

DESCRIPTIONS OF THE PREFERRED EMBODIMENT

Figure 1:
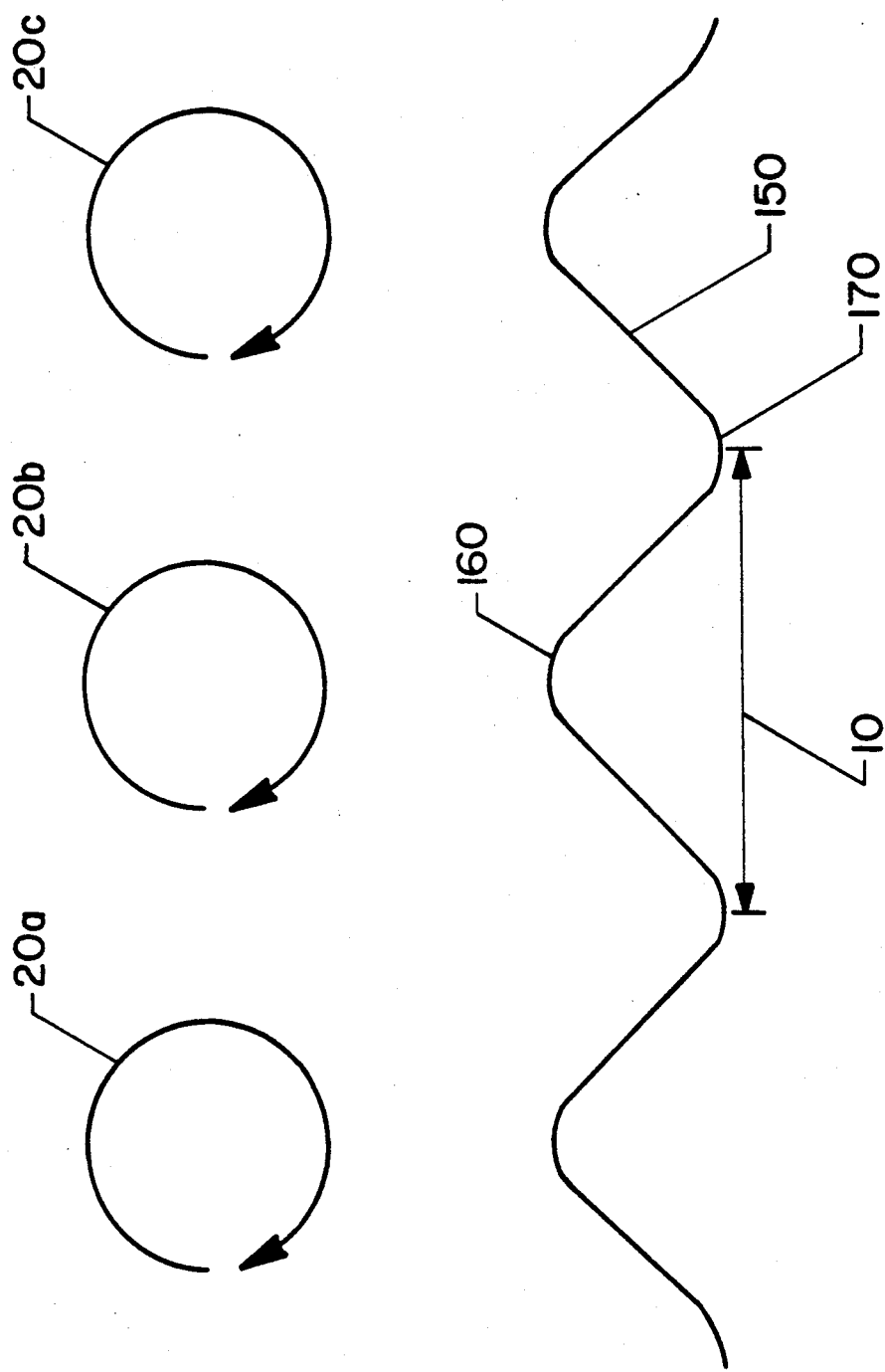
FIG. 1 is a theoretical characterization of cross-flow vortices and a root-mean-square signal.

As shown in FIG. 1, cross-flow disturbances are theoretically characterized by a series of co-rotating cross-flow vortices 20a–c. Surface measurements of the shear stress on a airfoil should show a region of high-shear 160 where the cross-flow vortices 20a–c direct airflow toward the surface of the airfoil. On the other hand, a region of low-shear 170 should exist where the cross-flow vortices direct air flow away from the surface of an airfoil. Accordingly, a root-mean-square signal 150 from spanwise, surface-mounted sensors measuring shear stress would give a peak 160 near the middle of the cross-flow vortex 20b and a valley 170 between the two vortices 20b and 20c. The distance between two successive peaks or valleys corresponds to the wavelength 10 between the two cross-flow vortices 20b and 20c. The present invention provides a method for obtaining a direct and true value of the wavelength 10.

Figure 2:
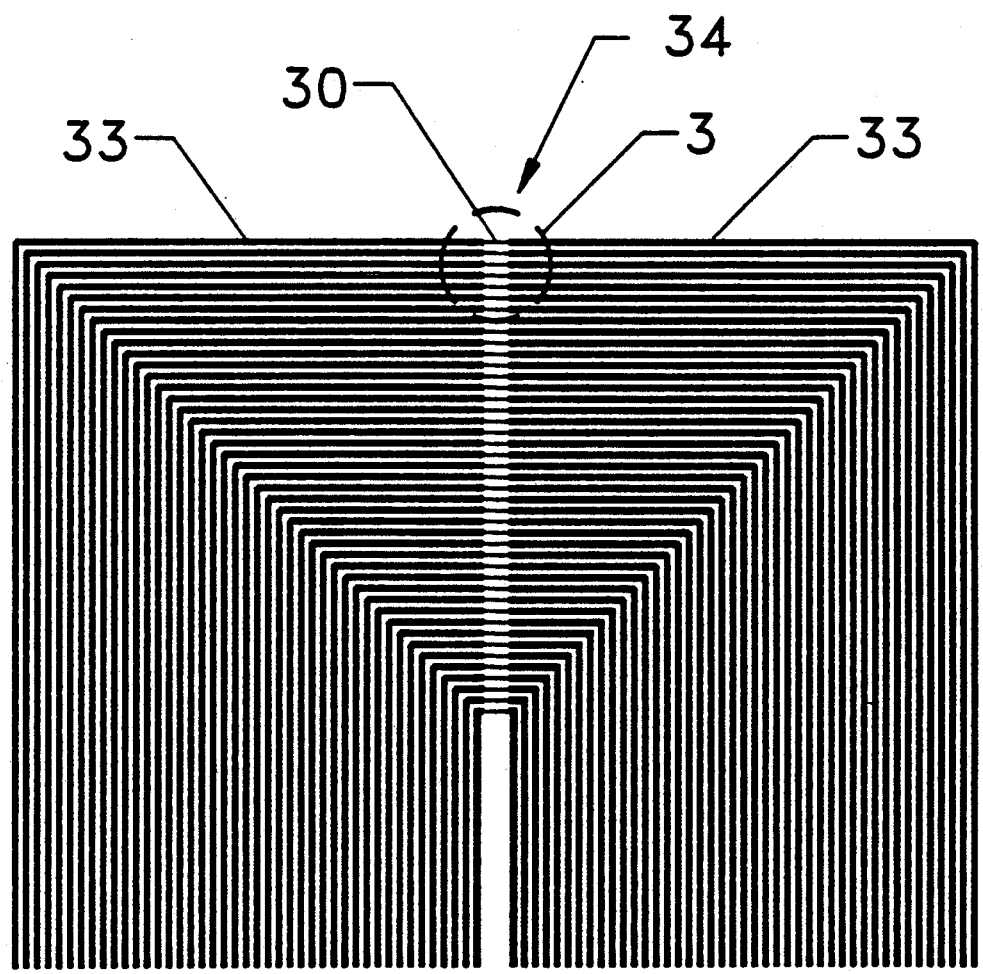
FIG. 2 shows a plurality of hot-film sensors used in the present invention.
Figure 3:
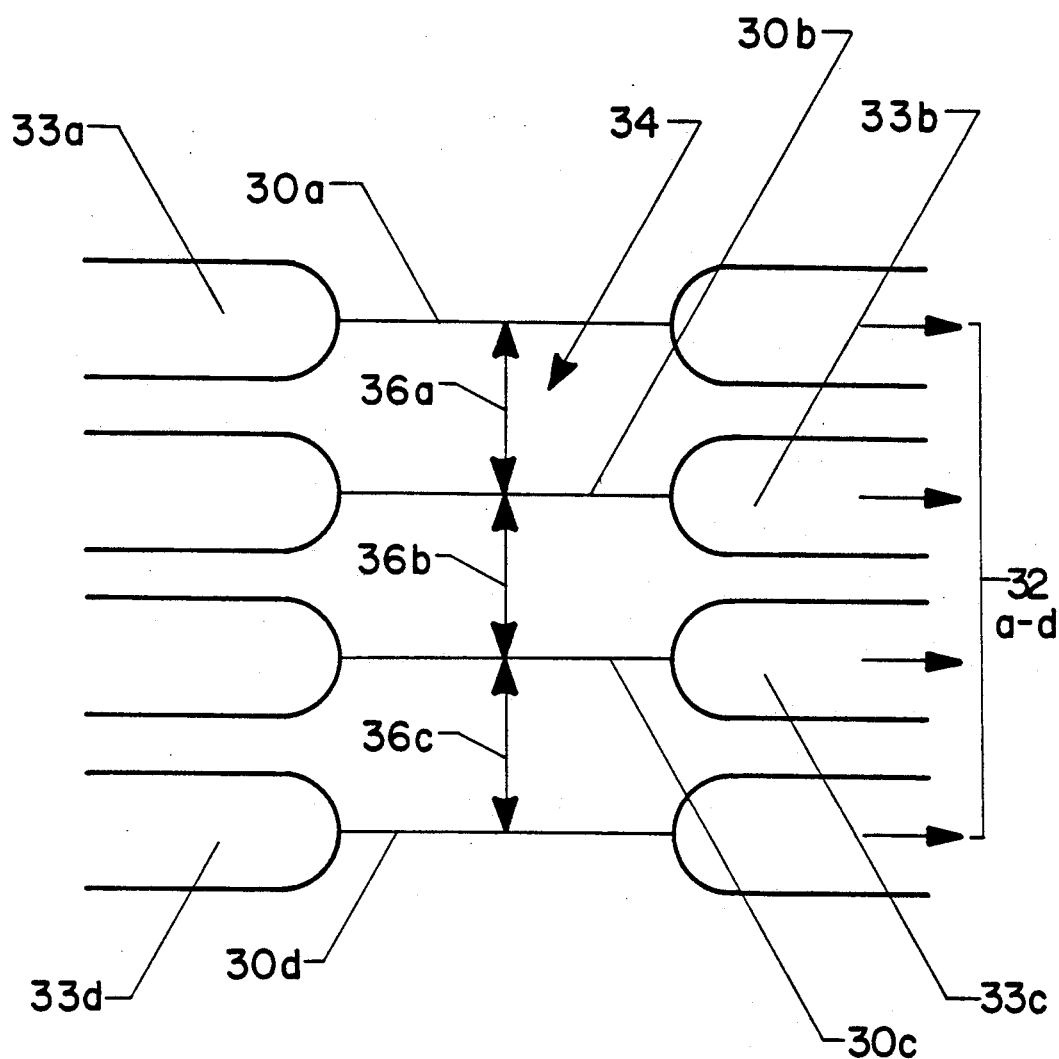
FIG. 3 is a magnified view of the hot-film sensors in FIG. 2.

FIG. 2 depicts a plurality of hot-film sensors 30 used by the method of the present invention, and FIG. 3 particularly identifies sensors 30a-d. The hot-film sensors 30 are formed by vapor deposition of layers of nickel and copper on a 2-mil thick Kapton ® sheet. Preferably, each hot-film sensor 30a-d is made of nickel and is 0.045 inches long and 0.005 inches wide. Each hot-film sensor 30a-d provides a signal 32a-d which is related to flow conditions on the surface of an airfoil. A pair of copper leads 33a-d connect at each end of the hot-film sensor 30a-d and transmit the signal 32a-d for further processing. Preferably, the cold resistance of each hot-film sensor 30a-d is within a maximum variation of ±0.2-ohm.

Each sensor 30a-d is spaced in a straight-line array 34 such that each distance or spacing 36a-c between successive hot-film sensors is less than the wavelength 10 of the cross-flow vortices being measured. Preferably, the sensors 30a-d are equally spaced distances 36a-c, and the distances 36a-c are each within a range of one-eighth to one-tenth the wavelength 10 of the cross-flow vortices. Thus, eight to ten sensors 30 equally spaced within the distance of one wavelength 10 will optimize results. An equal sensor spacing of 0.75 mm, for example, has given good results.

Figure 4:
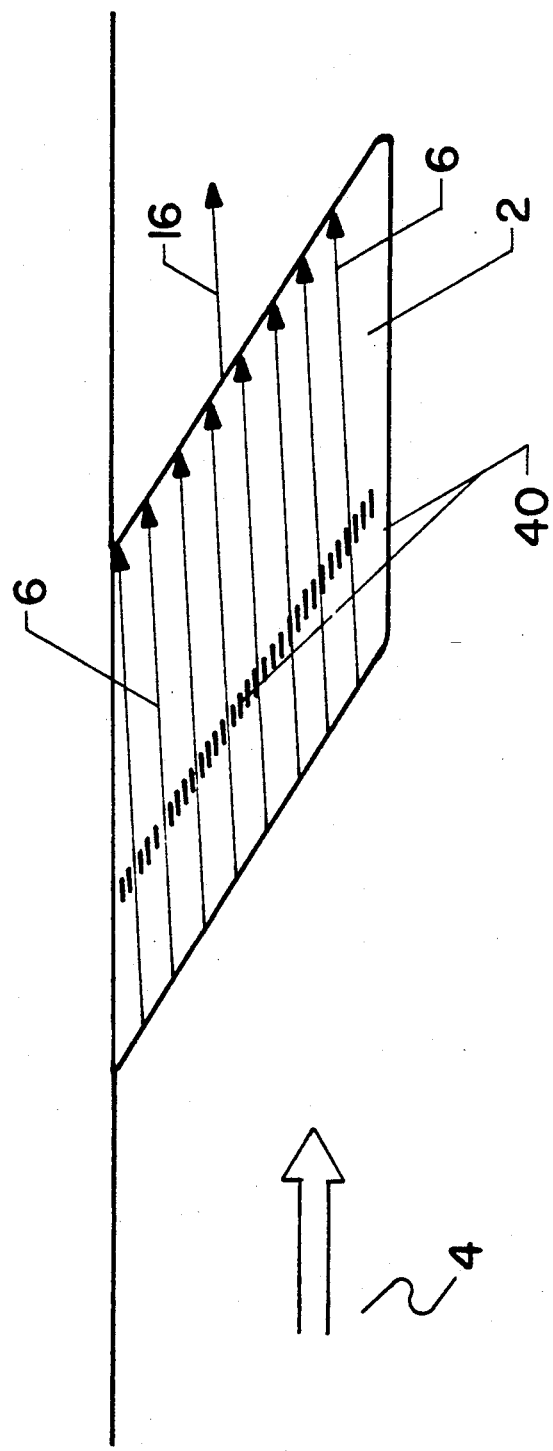
FIG. 4 illustrates the surface flow characteristics of air flow across a swept airfoil.

FIG. 4 illustrates the surface flow characteristics of an air flow 4 traveling across a swept airfoil 2 and having streamlines of flow 6 with a direction of travel 16. One method of determining the direction of travel 16 across the airfoil 2 is flow visualization. Flow visualization uses a sublimating chemical, such as a naphthalene spray, to coat a white surface over a painted black wing. The naphthalene sublimates faster in the high-shear regions, which reveal the direction of travel 16 of the streamlines as alternating black and white streaks. Once the direction of travel 16 is determined, the straight-line array 34 is positioned perpendicular to the direction 16. Each sensor thus has a spanwise location 40 on the airfoil 2, which is perpendicular to the direction of travel 16.

Figure 5:
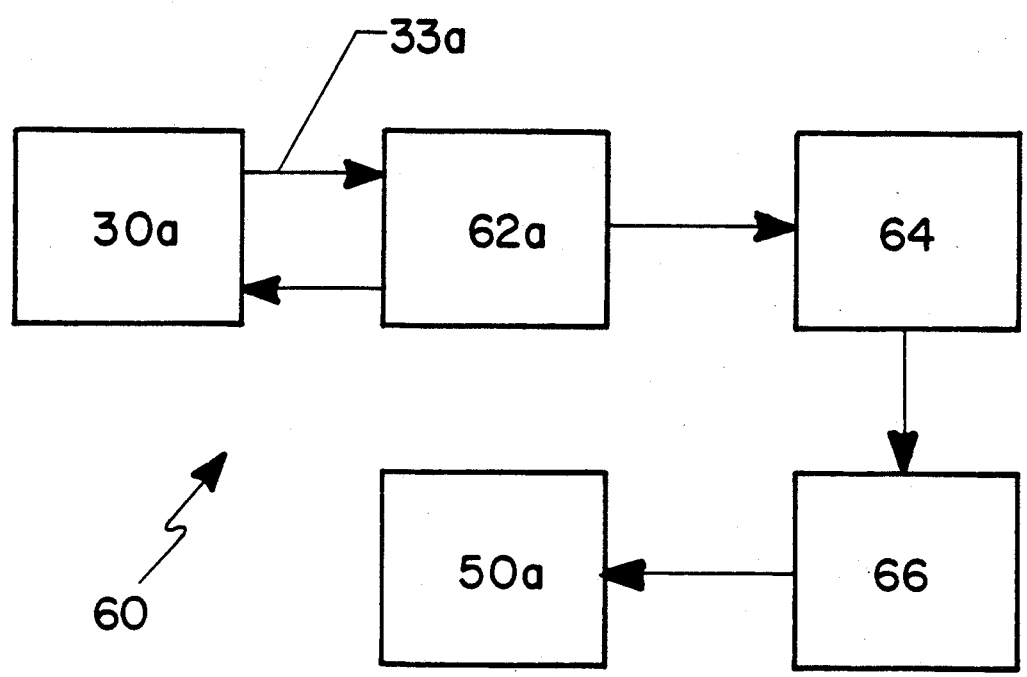
FIG. 5 shows a system of signal processing according to the present invention.

FIG. 5 describes a system of signal processing 60 of the present invention. System 60 comprises a plurality of hot-film sensors 30, a plurality of constant temperature anemometers 62, a digital data acquisition system 64, a computer 66, and a plurality of root-mean-square values 50. FIG. 5 particularly identifies one network of system 60, although the system 60 has a network for each sensor 30. Each constant temperature anemometer (e.g., 62a) sends a current through each lead (e.g., 33a) to each sensor (e.g., 30a) to maintain each sensor at a constant temperature. Each sensor (e.g., 30a) returns a signal (e.g., 32a) through each lead (e.g., 33a) to each constant temperature anemometer (e.g., 62a). The common digital data acquisition system 64 then reads each signal 32a and transmits the data to the common computer 66. Computer 66 accordingly analyzes each signal (e.g., 32a) and provides a plurality of root-mean-square values 50. Thus, each sensor (e.g., 30a) has a corresponding root-mean-square value (e.g., 50a).

Figure 6:
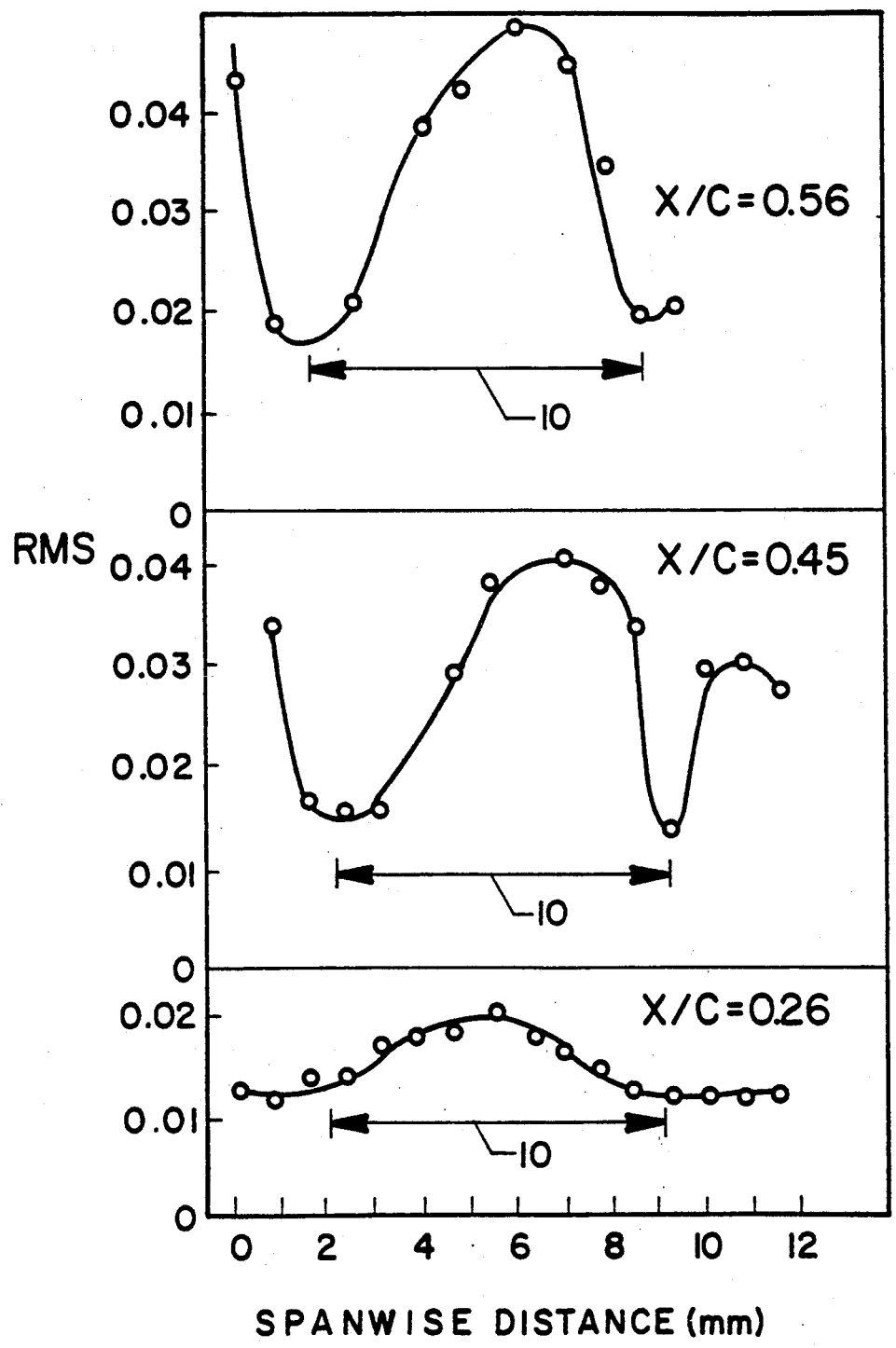
FIG. 6 demonstrates spanwise cross-flow vortices development for varying chord locations.

FIG. 6 illustrates spanwise cross-flow vortex development for varying chord locations X/C, with the Reynolds number at 2.5 million. Each root-mean-square (RMS) value 50, which is measured in volts may be plotted as a function of its corresponding spanwise location 40, which is measured in millimeters. At chord locations $X/C < 0.26$, any spanwise variation in RMS is obscured by a low signal. At $X/C \geq 0.26$, the cross-flow vortices are well-developed and the RMS variation clearly shows a peak and two valleys. The wavelength 10 is determined from the plot of FIG. 6 simply by noting the distance 10 between two maxima or two minima of the RMS values 50.

We claim:

1. A method for measuring the wavelength of cross-flow vortices of air flow having streamlines of flow traveling across a swept airfoil, comprising:

providing a plurality of hot-film sensing means, each sensing means providing a signal, each sensing means being spaced in a straight-line array such that the distance between successive hot-film sensing means is less than the wavelength of the cross-flow vortices being measured;

determining the direction of travel of the streamlines across the airfoil;

positioning the straight-line array of hot-film sensing means perpendicular to the direction of travel of the streamlines, such that each sensing means has a spanwise location;

processing the plurality of signals provided by the plurality of hot-film sensing means to provide a plurality of root-mean-square values for each said signal;

plotting each root-mean-square value against the corresponding spanwise location of each sensing means; and determining the wavelength of the cross-flow vortices by observing the distance between one of two maxima of root-mean-square values and two minima of root-mean-square values.

2. A method according to claim 1, wherein the plurality of hot-film sensing means are equally spaced in the straight-line array.

3. A method according to claim 1, wherein the distance between each hot-film sensing means is between one-eighth and one-tenth the wavelength of the cross-flow vortices being measured.

4. A method according to claim 1, wherein each hot-film sensing means has a cold resistance within a maximum variation of ±0.2 ohm.

* * * * *